United States Patent [19]

Fiddes

[11] Patent Number: 6,036,448
[45] Date of Patent: Mar. 14, 2000

[54] FUEL PUMP SEALED IN A BELLOWS

[75] Inventor: David W. Fiddes, Redford, Mich.

[73] Assignee: Chrysler Corporation, Auburn Hills, Mich.

[21] Appl. No.: 09/152,206

[22] Filed: Sep. 11, 1998

[51] Int. Cl.[7] ....................................... F01B 3/02
[52] U.S. Cl. .................. 417/269; 92/71; 91/499
[58] Field of Search .................. 417/269, 430, 417/472; 92/71, 34; 91/499

[56] References Cited

U.S. PATENT DOCUMENTS

| | | |
|---|---|---|
| 2,759,467 | 8/1956 | Leibing . |
| 5,307,731 | 5/1994 | Chamberlain et al. . |
| 5,419,687 | 5/1995 | Adahan . |
| 5,573,384 | 11/1996 | Ernsberger . |
| 5,667,203 | 9/1997 | Römer . |
| 5,755,562 | 5/1998 | Novacek et al. . |
| 5,772,413 | 6/1998 | Oshidari ................................ 417/472 |
| 5,782,161 | 7/1998 | Okubo et al. ........................... 92/71 |
| 5,832,904 | 11/1998 | Morishita et al. .................... 123/514 |

Primary Examiner—Erick R. Solis
Assistant Examiner—Arnold Castro
Attorney, Agent, or Firm—Kenneth H. Maclean

[57] ABSTRACT

A piston-type fuel pump has two or more cylinder bores in a barrel. A piston in each cylinder bore has a port for admitting fuel into the cylinder bore. A swash plate assembly includes a wobble plate connected to each of the pistons. The wobble plate is given an oscillatory motion producing reciprocal movement of the pistons. A thin-walled metal bellows defines a closed interior space surrounding the pistons to prevent escape of fuel.

5 Claims, 1 Drawing Sheet

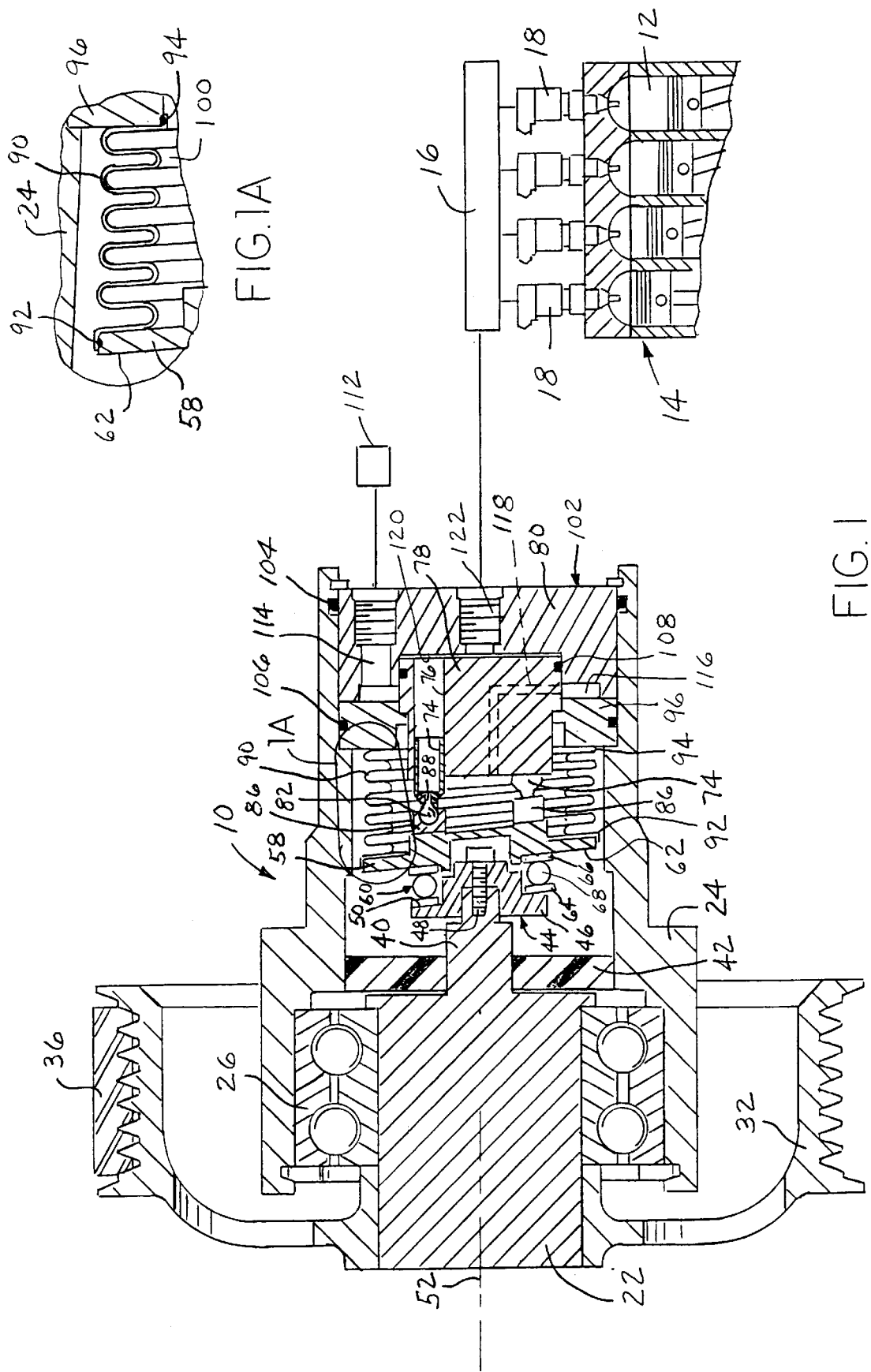

FUEL PUMP SEALED IN A BELLOWS

This invention relates generally to fuel injection systems and more particularly to a piston-type fuel pump.

BACKGROUND AND SUMMARY OF THE INVENTION

In fuel pumps of the piston-type, the pistons may be connected to a swash plate assembly, so that oscillatory motion of the swash plate assembly and resultant reciprocal motion of the pistons causes fuel to be pumped at a relatively high pressure to the combustion chambers or cylinders of an internal combustion engine. Although it is essential to prevent the escape of fuel, in the past sealing has been a problem.

In accordance with the present invention, a bellows surrounds the pistons. The bellows is preferably in the form of a thin-walled, flexible, cylindrical tube preferably made of metal and having a sinuous side wall. One end of the bellows is connected to the swash plate assembly and the other end is connected to a base or barrel having cylinder bores in which the pistons reciprocate. As a result, the bellows provides a closed interior space surrounding the pistons and preventing the escape of fuel.

One object of this invention is to provide a piston-type fuel pump having the foregoing features and capabilities.

Another object is to provide a piston-type fuel pump employing a bellows for sealing the internal movable parts of the fuel pump.

These and other objects, features and advantages of the invention will become more apparent as the following description proceeds, especially when considered with the accompanying drawings.

BRIEF DESCRIPTION OF THE DRAWINGS

FIG. 1 is a sectional view of a piston-type fuel pump constructed in accordance with the invention, also showing a fuel rail and the cylinders of an internal combustion engine to which fuel is pumped by the fuel pump.

FIG. 1A is an enlarged fragmentary sectional view of a portion of FIG. 1 shown within the loop 1A.

DETAILED DESCRIPTION OF THE PREFERRED EMBODIMENT

Referring now more particularly to the drawings, there is shown a fuel pump 10 for pumping gasoline or other fuel at high pressure to the combustion chambers or cylinders 12 of an internal combustion engine 14 through a common fuel rail 16 and separate fuel injectors 18. The injectors 18 open in a predetermined sequence for injecting a fine mist of fuel directly into the combustion chambers 12.

A cylindrical input shaft 22 is mounted for rotation within a cylindrical pump housing 24 by a ball bearing unit 26. The pump housing is supported in a stationary position by support structure (not shown) of the engine. A pulley 32 is mounted on the outer end of the input shaft 22. A belt 36 driven by the engine extends over the pulley 32 to rotate the pulley and the shaft 22. A gear train or other suitable drive mechanism could be employed to rotate the shaft 22.

The inner end of the shaft has a central extended portion 40 of reduced diameter. The portion 40 extends through a central opening in an annular seal 42 disposed within the housing 24.

A swash plate assembly 44 is mounted on the portion 40 of the shaft 22. More specifically, the swash plate assembly has a swash plate member 46 secured to the portion 40 of the input shaft 22 by a fastener 48. The swash plate member 46 produces axially directed forces for pumping fuel by means of an annular working face or surface 50. The surface 50 is in a plane which is at predetermined angle or axis of inclination with respect to the rotational axis 52 of the shaft 22.

The swash plate assembly also includes a creeper plate or wobble plate 58 which is positioned adjacent to the working face 50 of the swash plate member 46. A roller bearing unit 60 is provided between the working face 50 of the swash plate member 46 and an opposed surface 62 of the wobble plate 58, the two surfaces being maintained in a parallel relationship by the roller bearing unit.

The roller bearing unit 60 includes a race member 64 engaging the working face 50 of the swash plate member 46 and a race member 66 engaging the opposed face 62 of the wobble plate, with rollers 68 between the two race members. The arrangement is such that the surface 62 of the wobble plate 58 will always remain parallel to the working surface 50 of the swash plate member 46 so that as the swash plate member rotates the wobble plate will have an oscillatory motion. The wobble plate 58 does not rotate as will be understood from the description to follow.

Pistons 74 in the form of elongated tubular members are reciprocated in parallel, circumferentially spaced cylinder bores 76 in a barrel 78. The barrel 78 is secured in a fixed position on an end cap 80 within the pump housing 24. The pistons 74 have extended end portions which extend outwardly of the cylinder bores and on which piston heads 82 are formed. The piston heads 82 are swivelled in sockets in the slipper members 86 carried by the wobble plate 58. Oscillatory motion of the wobble plate 58 produces reciprocatory movement of the pistons. Ports 88 in the extended end portions of the pistons open into the hollow interior of the pistons.

A bellows 90 surrounds the extended end portions of the pistons. The bellows 90 preferably is in the form of a thin-walled flexible metal tube and has a sinuous side wall. One end 92 of the bellows is secured in a sealed relationship to the periphery of the wobble plate 58. The opposite end 94 of the bellows is secured in a sealed relationship to a ring 96 which is inside the housing in contact with the end cap 80. The bellows thus provides a sealed, closed interior space 100 between the wobble plate and the ring 96 which surrounds and encloses the extended end portions of the pistons. The barrel 78, end cap 80 and ring 90 together form a fixed base 102 with the pump housing.

O-ring seals 104, 106 and 108 are provided between the housing 24 and end cap 80, between the housing and the ring 96, and between the end cap and barrel 78.

Fuel from a tank 112 enters the pump housing 24 through an inlet port 114. The fuel passes from the inlet port 114 through an annular passage 116 between the end cap 80 and the ring 96, and through a passage 118 in the barrel to the space 100 enclosed by the bellows. From the space 100, the fuel passes through the ports 88 in the pistons into the cylinder bores 78. During the pumping stroke of each piston, fuel is moved at high pressure past outlet reed 120 between the barrel 78 and the end cap 80 and through an outlet 122, into the fuel rail 16.

The closed interior space 100 provided by the bellows 90 thus prevents the escape of fuel from the fuel pump.

What is claimed is:

1. A piston-type fuel pump comprising:

a base;

at least one cylinder bore in said base;

a piston in said cylinder bore having an end portion extending therefrom, said end portion of said piston having a port for admitting fuel into said cylinder bore;

a swash plate assembly including a wobble plate operatively connected to said end portion of said piston;

means for producing oscillatory motion of said wobble plate and resultant reciprocal movement of said piston in said cylinder bore; and a bellows defining a closed interior space and having opposite first and second end portions;

said first end portion of said bellows being sealingly attached to said base and said second end portion of said bellows being sealingly attached to said wobble plate so that said interior space of said bellows surrounds said extending end portion of said piston to prevent escape of fuel.

2. A fuel pump according to claim 1, wherein said bellows is made of a flexible metal.

3. A fuel pump according to claim 1, wherein said bellows is in the form of a cylindrical tube having a sinuous side wall.

4. A fuel pump according to claim 1, and further including a second cylinder bore in said base spaced from and parallel to said one cylinder bore, and a second piston in said second cylinder bore having a second end portion extending therefrom in which a second port is provided for admitting fuel into said second cylinder bore.

5. A fuel pump according to claim 4, wherein said bellows is in the form of a thin-walled, flexible cylindrical tube made of metal and having a sinuous side wall.

* * * * *